US012605835B2

(12) United States Patent
Lickiss et al.

(10) Patent No.: US 12,605,835 B2
(45) Date of Patent: Apr. 21, 2026

(54) COLLABORATIVE ROBOT WELDING SYSTEM

(71) Applicant: Lincoln Global, Inc., Santa Fe Springs, CA (US)

(72) Inventors: Emily A. Lickiss, Fort Collins, CO (US); Jacob F. Aas, Windsor, CO (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 504 days.

(21) Appl. No.: 18/211,641

(22) Filed: Jun. 20, 2023

(65) Prior Publication Data

US 2024/0424665 A1 Dec. 26, 2024

(51) Int. Cl.
  *B25J 9/16* (2006.01)
  *B23K 37/02* (2006.01)
  *B25J 9/00* (2006.01)
(52) U.S. Cl.
  CPC ......... *B25J 9/1671* (2013.01); *B23K 37/0229* (2013.01); *B25J 9/0081* (2013.01); *B25J 9/1664* (2013.01); *G05B 2219/45104* (2013.01)
(58) Field of Classification Search
  CPC ...... B25J 9/1671; B25J 9/0081; B25J 9/1664; B23K 37/0229; G05B 2219/45104; G05B 19/4068
  See application file for complete search history.

(56) References Cited

U.S. PATENT DOCUMENTS

| | | | |
|---|---|---|---|
| 4,458,326 A | 7/1984 | Kinoshita | |
| 4,821,207 A | 4/1989 | Ming et al. | |
| 10,684,604 B2 | 6/2020 | Noda et al. | |
| (Continued) | | | |

FOREIGN PATENT DOCUMENTS

| | | |
|---|---|---|
| CN | 111612848 A | 9/2020 |
| CN | 113199475 A | 8/2021 |
| (Continued) | | |

OTHER PUBLICATIONS

Kim, et al.; "Interpolation of Orientation for Precise Path Generation in Industrial Robots;" Robotics & Computer-Integrated Manufacturing; vol. 6, No. 3; Dated 1989; pp. 253-258.

*Primary Examiner* — Kamini S Shah
*Assistant Examiner* — Zachary Andrew Cain
(74) *Attorney, Agent, or Firm* — Brad C. Spencer

(57) ABSTRACT
A method of programming a curved path for a welding robot includes recording input of a first arc segment endpoint, a first intermediate point, and a second arc segment endpoint along the curved path. The first intermediate point is located between the first and second arc segment endpoints. The curved path is determined from the first and second arc segment endpoints and the first intermediate point. Input of a third arc segment endpoint is recorded. A distance of the third arc segment endpoint to the curved path is determined and compared to a threshold distance. A second intermediate point along the curved path between the second and third arc segment endpoints is automatically interpolated when the distance is less than the threshold distance. The first, second and third arc segment endpoints, and the first and second intermediate points are communicated to a robot controller to program movements of the welding robot.

20 Claims, 8 Drawing Sheets

(56) References Cited

U.S. PATENT DOCUMENTS

| | | | | |
|---|---|---|---|---|
| 2007/0085850 A1* | 4/2007 | Hong | ..................... | G05B 19/41 |
| | | | | 345/442 |
| 2007/0145027 A1* | 6/2007 | Izawa | .................... | B23K 9/032 |
| | | | | 219/124.34 |
| 2020/0101607 A1* | 4/2020 | Matsushima | .......... | G05B 19/42 |
| 2022/0395978 A1* | 12/2022 | Sherrod | ................ | B25J 9/1653 |

FOREIGN PATENT DOCUMENTS

| | | | |
|---|---|---|---|
| JP | S62-271004 A | 11/1987 |
| JP | 2003-308115 A | 10/2003 |

* cited by examiner

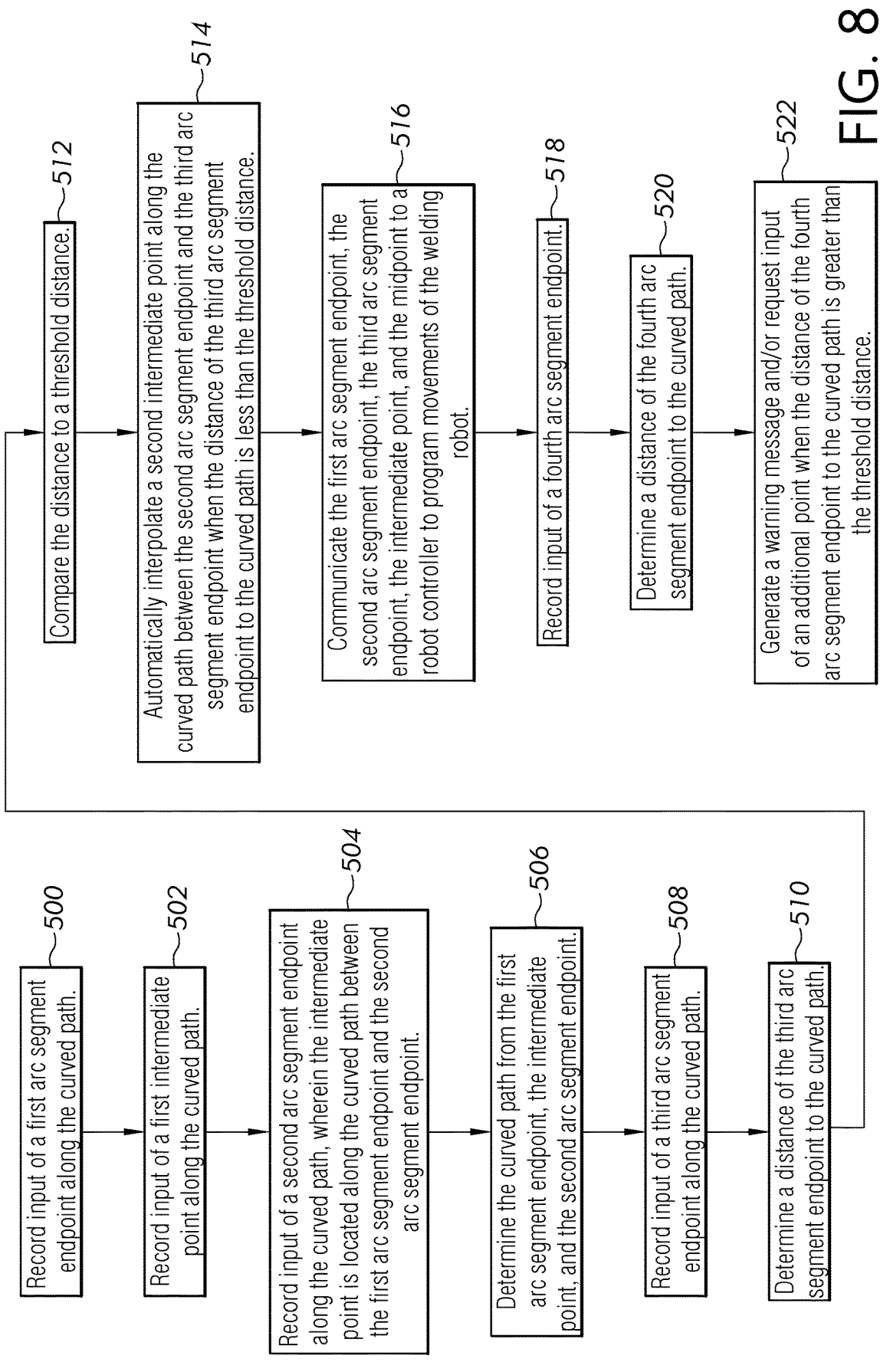

FIG. 8

Record input of a first arc segment endpoint along the curved path. — 500

Record input of a first intermediate point along the curved path. — 502

Record input of a second arc segment endpoint along the curved path, wherein the intermediate point is located along the curved path between the first arc segment endpoint and the second arc segment endpoint. — 504

Determine the curved path from the first arc segment endpoint, the intermediate point, and the second arc segment endpoint. — 506

Record input of a third arc segment endpoint along the curved path. — 508

Determine a distance of the third arc segment endpoint to the curved path. — 510

Compare the distance to a threshold distance. — 512

Automatically interpolate a second intermediate point along the curved path between the second arc segment endpoint and the third arc segment endpoint when the distance of the third arc segment endpoint to the curved path is less than threshold distance. — 514

Communicate the first arc segment endpoint, the second arc segment endpoint, the third arc segment endpoint, the intermediate point, and the midpoint to a robot controller to program movements of the welding robot. — 516

Record input of a fourth arc segment endpoint. — 518

Determine a distance of the fourth arc segment endpoint to the curved path. — 520

Generate a warning message and/or request input of an additional point when the distance of the fourth arc segment endpoint to the curved path is greater than the threshold distance. — 522

COLLABORATIVE ROBOT WELDING SYSTEM

BACKGROUND OF THE INVENTION

Field of the Invention

Embodiments of the present invention relate to the use of collaborative robots (cobots) for welding, additive manufacturing or plasma cutting. More specifically, embodiments of the present invention relate to systems and methods for quickly, intuitively and accurately programming the cobot to follow curved welding, additive manufacturing, or cutting paths via user interface application software.

Description of Related Art

The motions of a cobot can be programmed using a teach pendant. The teach pendant may be hardwired to a robot controller for the cobot or may communicate wirelessly with the robot controller. The teach pendant may take the form of a tablet device having primarily a touch screen interface and having user interface application software that provides software buttons or selectors and other input and informational devices/fields for programming the cobot. The cobot manufacturer typically provides a proprietary user interface application for programming its cobot, but such an application may not be optimal for welding, additive manufacturing, cutting or similar metal fabrication operations. Moreover, the requirements for programming circular or other curved paths using the proprietary user interface application may not be intuitive, especially to a novice user, and may require that an excessive number of points along the curved path be accurately input, which is time consuming. Thus, an improved user interface application for programming curved paths for use in welding, additive manufacturing, cutting or similar metal fabrication operations would be desirable.

BRIEF SUMMARY OF THE INVENTION

The following summary presents a simplified summary in order to provide a basic understanding of some aspects of the devices, systems and/or methods discussed herein. This summary is not an extensive overview of the devices, systems and/or methods discussed herein. It is not intended to identify critical elements or to delineate the scope of such devices, systems and/or methods. Its sole purpose is to present some concepts in a simplified form as a prelude to the more detailed description that is presented later.

In accordance with one aspect of the present invention, provided is a method of programming a curved path for a welding robot. The method includes recording input of a first arc segment endpoint along the curved path, recording input of a first intermediate point along the curved path, and recording input of a second arc segment endpoint along the curved path. The first intermediate point is located along the curved path between the first arc segment endpoint and second arc segment endpoint. The curved path is determined from the first arc segment endpoint, the first intermediate point, and the second arc segment endpoint. Input of a third arc segment endpoint is recorded. A distance of the third arc segment endpoint to the curved path is determined. The distance is compared to a threshold distance. A second intermediate point along the curved path between the second arc segment endpoint and the third arc segment endpoint is automatically interpolated when the distance of the third arc segment endpoint to the curved path is less than the threshold distance. The first arc segment endpoint, the second arc segment endpoint, the third arc segment endpoint, the first intermediate point, and the second intermediate point are communicated to a robot controller to program movements of the welding robot.

In accordance with another aspect of the present invention, provided is a welding system. The welding system includes a collaborative robot having a movable arm. A robot controller is operatively connected to the collaborative robot. A welding torch is attached to the movable arm of the collaborative robot. A welding power supply is operatively connected to the welding torch to supply welding current to the welding torch. A teach pendant is in communication with at least one of the robot controller and the welding power supply. The teach pendant includes a user interface application configured for programming a plurality of welding points of a welding operation performed by the collaborative robot. The user interface application is configured to receive input of a first arc segment endpoint along a curved path, receive input of a first intermediate along the curved path, and receive input a second arc segment endpoint along the curved path. The first intermediate point is located along the curved path between the first arc segment endpoint and the second arc segment endpoint. The user interface application determines the curved path from the first arc segment endpoint, the first intermediate point, and the second arc segment endpoint. The user interface application receives input of a third arc segment endpoint and determines a distance of the third arc segment endpoint to the curved path. The user interface application compares the distance to a threshold distance and automatically interpolates a second intermediate point along the curved path between the second arc segment endpoint and the third arc segment endpoint when the distance of the third arc segment endpoint to the curved path is less than the threshold distance. The user interface application communicates the first arc segment endpoint, the second arc segment endpoint, the third arc segment endpoint, the first intermediate point, and the second intermediate point to the robot controller to program movements of the collaborative robot.

In accordance with another aspect of the present invention, provided is a welding system. The welding system includes a collaborative robot having a movable arm. A robot controller is operatively connected to the collaborative robot. A welding torch is attached to the movable arm of the collaborative robot. A welding power supply is operatively connected to the welding torch to supply welding current to the welding torch. A teach pendant is in communication with at least one of the robot controller and the welding power supply. The teach pendant includes a user interface application configured for programming a plurality of welding points of a welding operation performed by the collaborative robot. The user interface application is configured to receive input of a first arc segment endpoint along a curved path, receive input of a first intermediate along the curved path, and receive input a second arc segment endpoint along the curved path. The first intermediate point is located along the curved path between the first arc segment endpoint and the second arc segment endpoint. The user interface application determines the curved path from the first arc segment endpoint, the first intermediate point, and the second arc segment endpoint. The user interface application receives input of a third arc segment endpoint along the curved path and receives input of a fourth arc segment endpoint along the curved path. The user interface application automatically interpolates a second intermediate point along the curved path between the second arc segment endpoint and the third arc segment endpoint and automatically interpolates a third intermediate point along the curved path between the third arc segment endpoint and the fourth arc segment endpoint. The user interface application communicates the first arc segment endpoint, the second arc segment endpoint, the third arc segment endpoint, the fourth arc segment endpoint, the first intermediate point, the second intermediate point, and the third intermediate point to the robot controller to program movements of the collaborative robot.

BRIEF DESCRIPTION OF THE DRAWINGS

The foregoing and other aspects of the invention will become apparent to those skilled in the art to which the invention relates upon reading the following description with reference to the accompanying drawings, in which:

FIG. 8 is a flow diagram; and

DETAILED DESCRIPTION OF THE INVENTION

Figure 1:
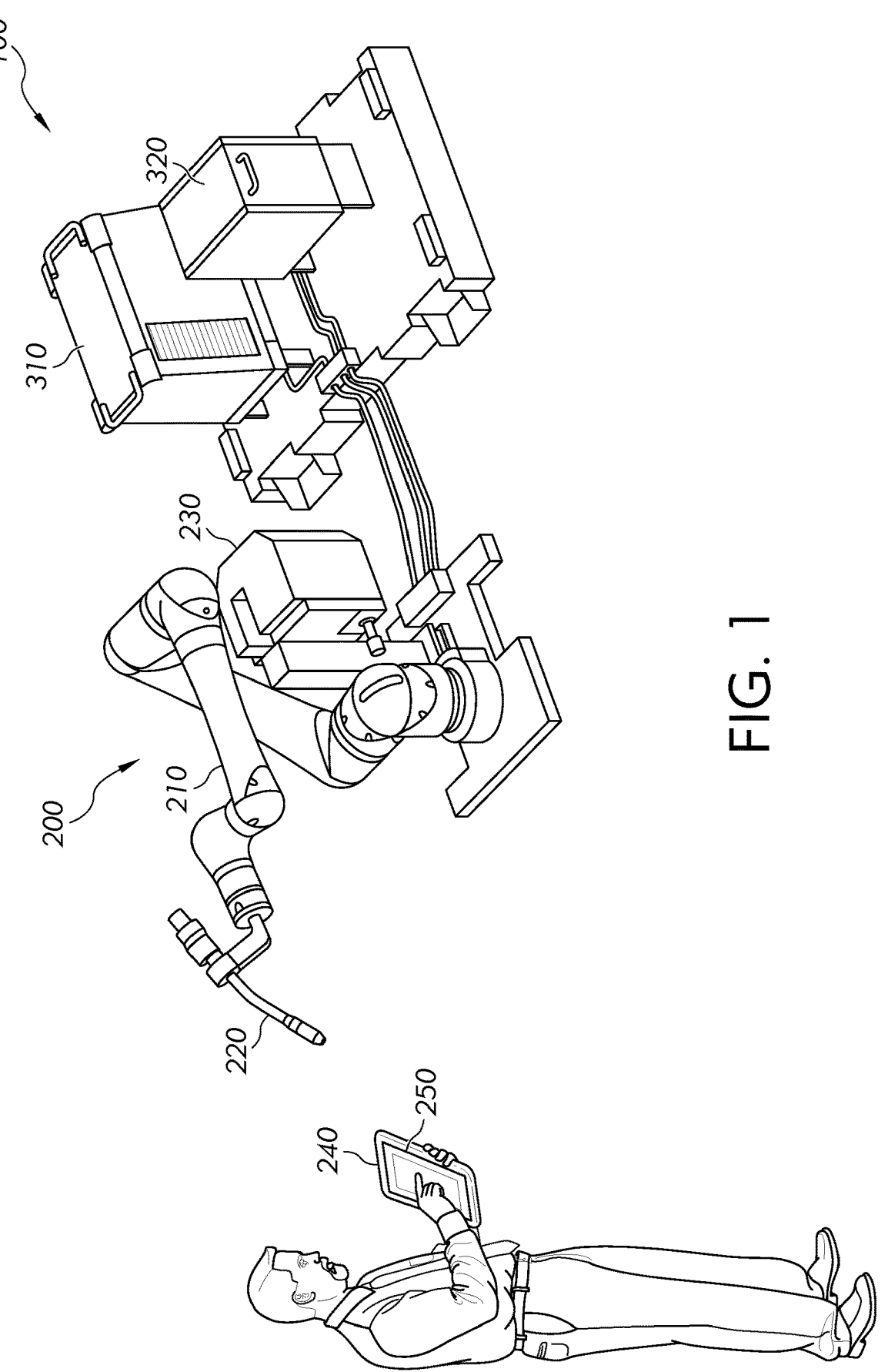
FIG. 1 shows a welding system having a collaborative robot.

The present invention relates to the use of collaborative robots (cobots) for welding, cutting, and similar operations and to systems and methods for quickly, intuitively and accurately programming the cobot to follow curved paths (e.g., through the use of user interface application software). The present invention will now be described with reference to the drawings, wherein like reference numerals are used to refer to like elements throughout. It is to be appreciated that the various drawings are not necessarily drawn to scale from one figure to another nor inside a given figure, and in particular that the size of the components are arbitrarily drawn for facilitating the understanding of the drawings. In the following description, for purposes of explanation, numerous specific details are set forth in order to provide a thorough understanding of the present invention. It may be evident, however, that the present invention can be practiced without these specific details. Additionally, other embodiments of the invention are possible and the invention is capable of being practiced and carried out in ways other than as described. The terminology and phraseology used in describing the invention is employed for the purpose of promoting an understanding of the invention and should not be taken as limiting.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. Any disjunctive word or phrase presenting two or more alternative terms, whether in the description of embodiments, claims, or drawings, should be understood to contemplate the possibilities of including one of the terms, either of the terms, or both terms. For example, the phrase "A or B" should be understood to include the possibilities of "A" or "B" or "A and B."

Embodiments of the present invention are described herein in the context of a cobot welding system. Example welding processes include gas metal arc welding (GMAW), flux-cored arc welding (FCAW), metal-cored arc welding (MCAW), gas tungsten arc welding (GTAW), and the like. In addition to welding operations, embodiments of the present invention can be used in plasma cutting operations and welding-type processes, such as additive manufacturing and hardfacing processes. Thus, the term "welding" is to be interpreted to include such welding-type processes. Because such systems and processes are well known, they will not be described in detail herein.

Referring to FIG. 1, the welding system 100 includes a collaborative robot (cobot) 200 having a movable arm 210 (e.g., a 6-axis robot arm). The cobot allows for direct user interaction and contact with the cobot within a shared area. In this manner, the cobot and the user can work closely together and the user can manipulate or manually move the arm 210 of the cobot. The welding system 100 further includes a welding power supply 310 (e.g., an inverter-based power supply), supporting arc welding, and a robot controller 320. In accordance with another embodiment, the power supply may be a cutting power supply supporting plasma cutting. The robot controller 320 is operatively connected to the cobot 200 to program and control its movements. The robot controller 320 may be operatively connected to the cobot 200 via, for example, robot cables (e.g., control and communications cables).

A welding torch 220 is attached to the movable arm 210 of the cobot, e.g., at a "wrist" portion of the cobot. The terms "torch" and "gun" are used herein interchangeably. The welding power supply 310 is operatively connected to the welding torch 220 to supply welding current to the welding torch during a welding operation. The welding power supply 310 may be operatively connected to the welding torch 220 via a welding cable for example. The welding torch 220 has a distal end that generates the welding arc. The distal end of the welding torch 220 is located at a tool center point (TCP), which is known by the robot controller and/or a cobot teach pendant 240 via a calibration.

The cobot 200 can include a servo-mechanism apparatus 230 configured to move the arm 210 of the cobot under the command of the robot controller 320 via a motion program (e.g., to support movement over multiple degrees of freedom). The welding system 100 can include a wire feeder (not shown) to feed welding wire to the welding torch 220.

The welding system 100 further includes a teach pendant 240 for programming the cobot 200. The teach pendant 240 can be used to program welding points (e.g., weld start, end, and intermediate points) along linear and curved paths of a welding operation to be performed by the cobot on a workpiece(s). The teach pendant 240 is operatively coupled to the robot controller 320 for bidirectional communications therewith. The teach pendant 240 may also be operatively coupled to the welding power supply 310 for bidirectional communications with the power supply. The teach pendant 240 can be hardwired or tethered to the robot controller 320 and/or welding power supply 310 or can communicate wirelessly (e.g., via wi-fi, Bluetooth, etc.) In certain embodiments, the teach pendant 240 can be a tablet device having a touchscreen user interface 250. The teach pendant 240 can have user interface application software through which the user interacts with the welding system 100 to program welding operations, such as torch movements during welding and various welding parameters. The user interface application can be hosted on the teach pendant 240 or elsewhere in the welding system (e.g., on the robot controller 320). In certain embodiments, the user interface application can be a web application. In addition to programming cobot arm 210 and torch 220 movements, the teach pendant 240 can be used to program welding parameters such as welding voltage or current, wire feed speed, trim setting, etc. The teach pendant 240 can also be used to program cobot arm 210 and torch 220 movements specific to a welding operation, such as welding weave frequency and weave width, dwell time, weave pattern, torch travel speed, torch angle (e.g., work angle and travel angle), etc.

Figure 2:
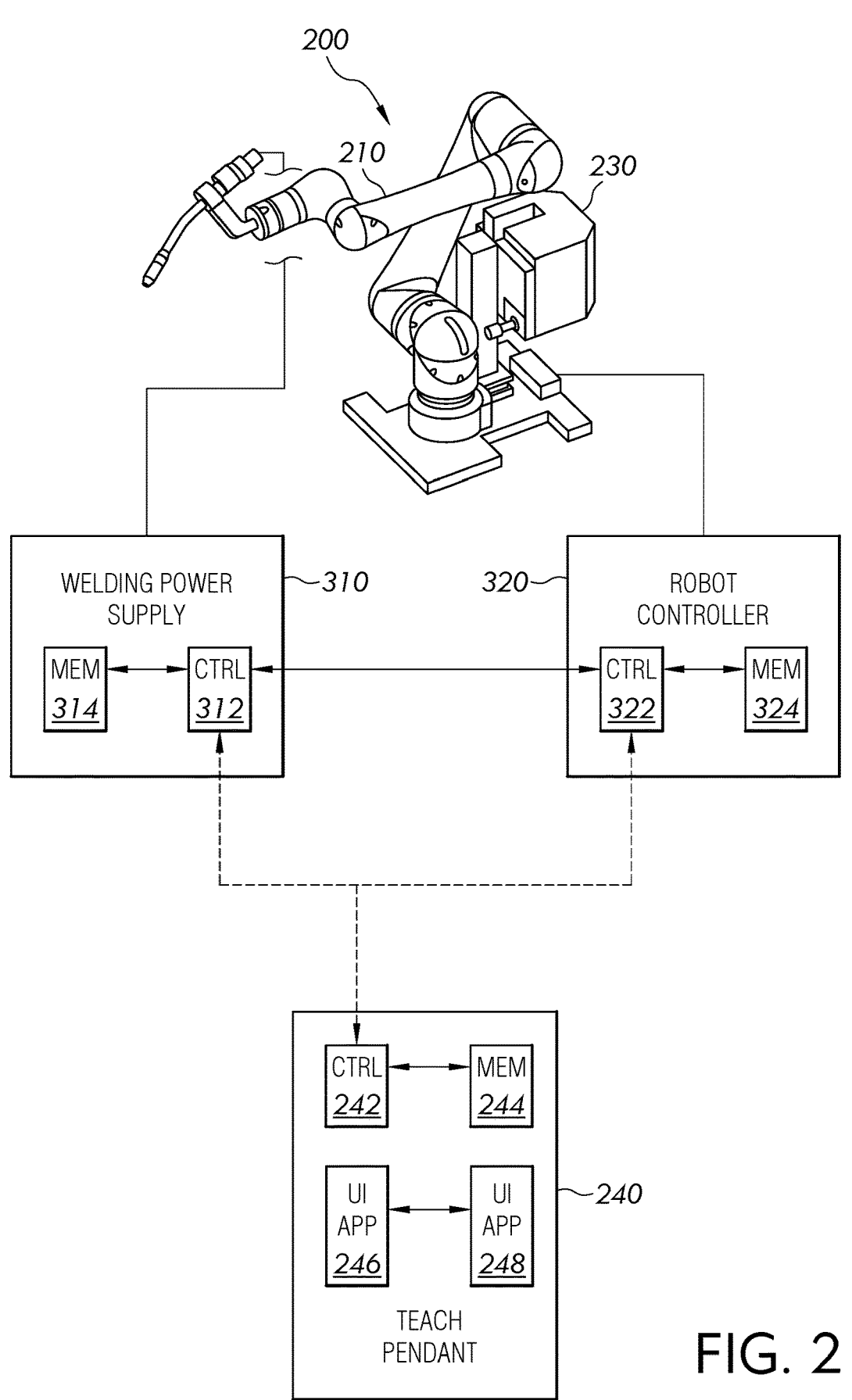
FIG. 2 is a block diagram of the welding system.

FIG. 2 is a schematic block diagram of the welding system 100. In addition to power electronic circuitry (e.g., PWM inverters, choppers, etc.), the welding power supply 310 can include a processor or controller 312 and memory 314. The memory 314 of the welding power supply 310 can store programmed instructions that, when executed by the processor 312, causes the power supply to perform the functionality ascribed to it herein. Similarly, the robot controller 320 and teach pendant 240 can include respective processors 322, 242 and memory 324, 244 for executing their functionality. Communications among the welding power supply 310, robot controller 320 and the teach pendant 240 are shown schematically in FIG. 2 via solid and dashed lines between the processors. The teach pendant 240 can include one or more user interface applications 246, 248. Cobot teach pendants typically include a user interface application 246 or programming software that is provided by the cobot manufacturer. However, the manufacturer-provided programming software is typically not tailored to welding operations. Thus, in an example embodiment, the teach pendant 240 can include a second user interface application 248 configured for programming both a plurality of welding points and a plurality of welding parameters of a welding operation performed by the cobot 200. The user interface applications 246, 248 can share information with each other and send data to and receive data from the robot controller 320 and/or the welding power supply 310. In an example embodiment, the second user interface application 248 can translate data into instructions or a computer language of the robot controller. In another example embodiment, the manufacturer-provided user interface application 246 can be excluded, and only the second user interface application 248 be employed in the welding system 100.

Figure 3:
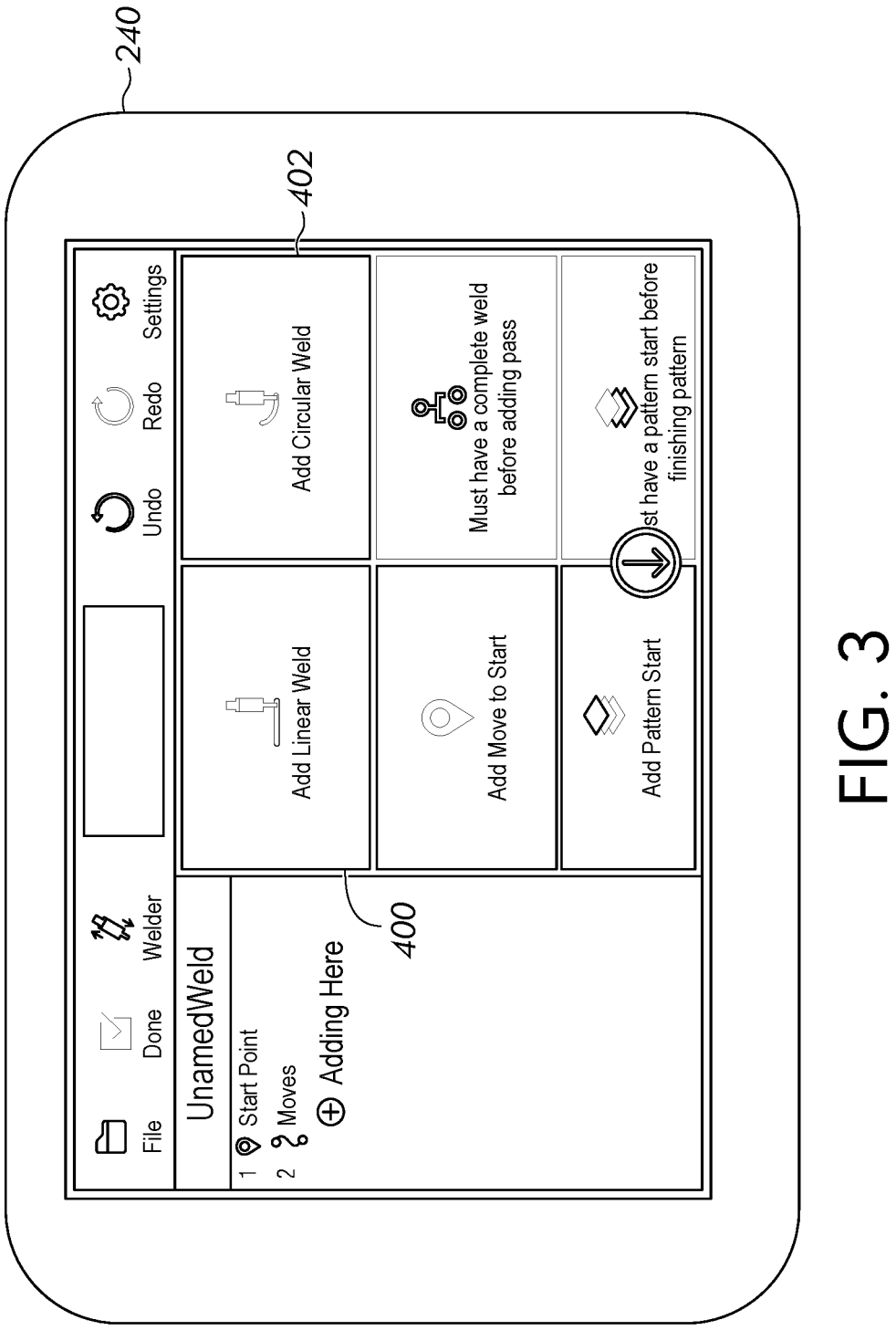
FIG. 3 is a screen shot of an example user interface application.
Figure 4:
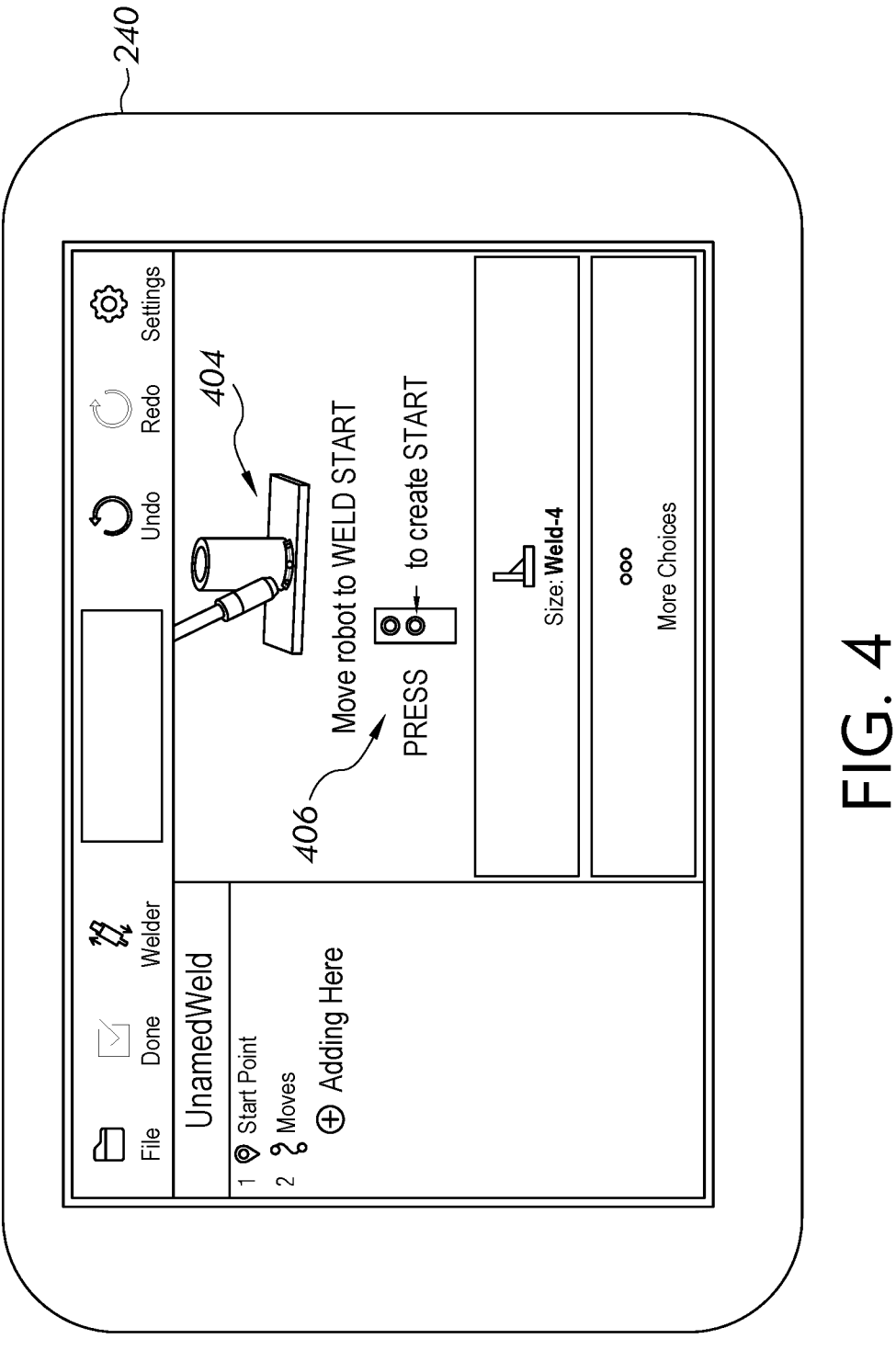
FIG. 4 is a screen shot of an example user interface application.

FIGS. 3 and 4 are example screen shots from the second user interface application 248 on the teach pendant 240 for programming the cobot to perform welds along curved paths. A circular weld is one example of a weld along a curved path. However, a myriad of curved paths could be programmed using the user interface application, such as welds along segments of a circle, welds along curved paths having a changing radius, etc. The user interface application can include an interface screen that displays respective selector buttons 400, 402 for adding linear welds and curved (e.g., circular) welds to a weld path. For example, a user activation of the "add circular weld" selector button 402 will initiate the input of a curved weld path, which may or may not be a complete circle. Activation of the "add circular weld" selector button 402 can trigger a transition to the interface screen shown in FIG. 4. The interface screen shown in FIG. 4 includes an informational pictogram 404 that indicates to the user that a curved weld path is to be programmed. The user will manually move the cobot arm to position the TCP at various points along the curved path to define and program the curved welding path. The welding torch or the cobot arm can include a button or other suitable input device to enter or input the various points along the curved path. The user inter interface application can include a further informational pictogram 406 that instructs the user to use the button on the welding torch or cobot arm to input the points along the curved path. The button inputs can be received by the robot controller, which then communicates the TCP weld locations to the user interface application in accordance with the cobot arm kinematics. The user interface application receives the TCP weld locations along the curved path as inputs to determine and program the curved path. Ultimately, the user interface application will communicate various welding points and torch movements to the robot controller to establish the weld path, which can include both linear and curved welds.

Figure 5:
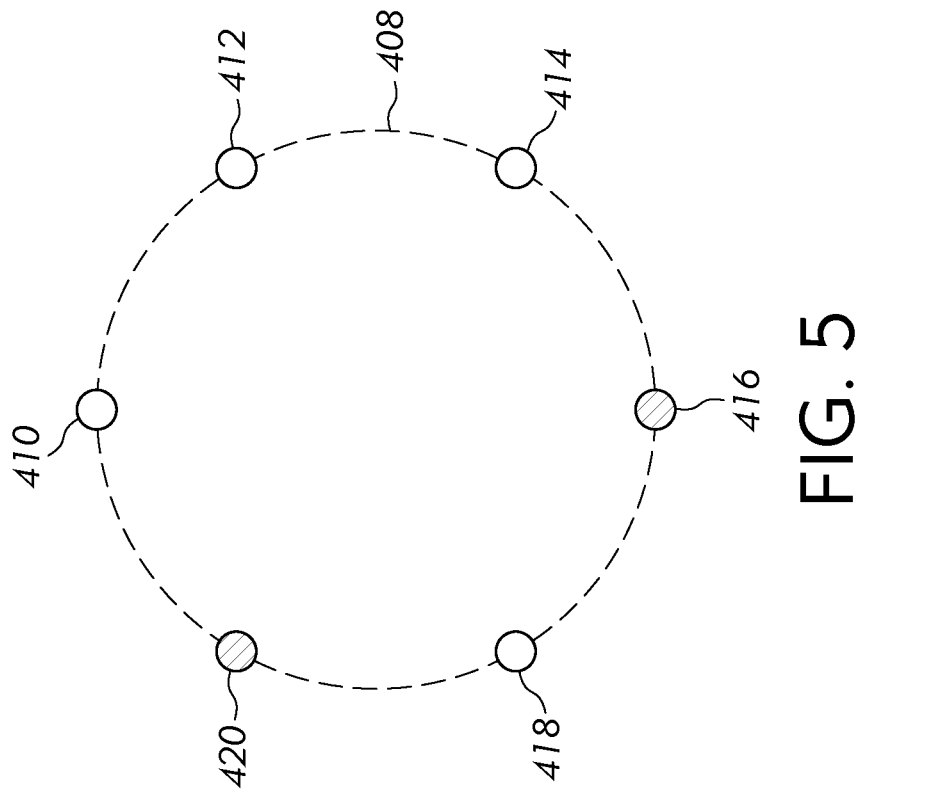
FIG. 5 shows an example circular welding path.

FIG. 5 shows an example circular weld path 408 and a number of points 410, 412, 414, 416, 418, 420 for defining or programming the path. Conventional, manufacturer-provided cobot programming software and robot controllers for cobots require that three points be input for defining or extending arc segments. For example, an initial arc segment or curved path can be established or defined from the input of a first arc segment endpoint 410, an intermediate point 412 along the curved path at or near the midpoint of the arc segment, and a second arc segment endpoint 414. Extending the curved path would conventionally require the user to input additional points in sets of two, for example inputting another intermediate point 416 and a third arc segment endpoint 418 to extend the weld path to endpoint 418. Once an arc or curved path is established, the previous endpoint 414 can be used as the starting point for the next arc segment, so that only two additional points 416, 418 are required to be input in the conventional system. With a curved path or arc segment defined by points 410, 412, 414, 416 and 418, extending the curved path to point 410 to complete a circular weld would conventionally require the user to input another set of two points, e.g., intermediate point 420 and a final arc segment endpoint 410.

The conventional system discussed above has several drawbacks. It is not intuitive to a user to always enter intermediate points when extending arc segments. Once an arc is established, a user would intuitively expect to enter various weld points but may not consider the need to enter intermediate points or to end the circular path programming by entering two rather than one final point. Moreover, entering the intermediate points is time consuming, especially on large and/or complicated welding operations. The need to enter intermediate points can also lead to errors because the user may not input the intermediate point at a location expected by the programming software or robot controller (e.g., near the midpoint of an arc segment). To address these problems, once a curved path has been established or determined (e.g., by weld points 410, 412, 414), the user interface application discussed herein performs interpolations to calculate the intermediate points 416, 420 as midpoints along arc segments so that the user only has to input additional arc segment endpoints. The user interface application then backfills the midpoints 416, 420 into the weld path instructions provided to the robot controller so that these points do not have to be manually input by the user.

Once a user has initiated the input or programming of a curved path, the user first inputs three points: a first arc segment endpoint 410 along the curved path, an intermediate point 412 along the curved path, and a second arc segment endpoint 414 along the curved path. The interme-
diate point 412 is located along the curved path between the
first arc segment endpoint 410 and the second arc segment
endpoint 414 and is at or near the midpoint of the arc
segment. From the first arc segment endpoint 410, the
intermediate point 412, and the second arc segment endpoint
414, the user interface application determines or calculates
the curved path. One of ordinary skill in the art will
understand how to determine a curved path from three points
along the curved path and accordingly such calculations
need not be discussed in detail herein. However, an example
process for calculating a circular weld path in 3D space can
be as follows. Given three points, P1, P2, P3 (e.g., points
410, 412, 414), find the 2D circle in 3D space. Each point is
a 3D point, e.g., P1=[P1$x$, P1$y$, P1$z$]. A 2D circle in 3D space
is defined by a normal vector, a center, and a radius.
Calculate the normal vector: subtract P2–P1 and P3–P2,
then cross those vectors, and then normalize to unit length.
Calculate the center: find plane of three points, rewrite
original three points to be in the 2D plane, find center using
normal 2D methods, then convert the center to original 3D
space. Calculate the radius: find distance between the center
and P1.

After inputting the first arc segment endpoint 410, the
intermediate point 412, and the second arc segment endpoint
414, the user need only enter additional arc segment end-
points to extend the curved path. The user interface appli-
cation will automatically interpolate the additional interme-
diate or midpoints required by the robot controller. For
example, to extend weld path 408 from arc segment end-
point 414 to endpoint 418, the user would reposition the
TCP to endpoint 418 and press the input button on the
welding torch or cobot arm. The user interface application
will calculate the midpoint 416 along the curved path
between points 414 and 418. Similarly, to extend weld path
408 from arc segment endpoint 418 to endpoint 410 to
complete a circular weld, the user would reposition the TCP
to endpoint 410 and press the input button on the welding
torch or cobot arm. The user interface application will
calculate the midpoint 420 along the curved path between
points 418 and 410. One of ordinary skill in the art will
understand how to interpolate a midpoint along an arc
segment between endpoints and accordingly such calcula-
tions need not be discussed in detail herein. However, an
example process for interpolating the midpoint can be as
follows. Given a circle and two points and percentage
between them (e.g., 50%), interpolate between by obtaining
the angle of both points on the circle, subtracting the angles,
multiply by the percentage between, and then determine the
point at that angle on the circle.

Once the curved weld path is established by entering three
initial points along the curve, additional intermediate points
(e.g., points 416 and 420) can be skipped by the user and
only further arc segment endpoints need be entered. The user
interface application will interpolate the intermediate points
(e.g., points 416 and 420) for the user and communicate
them to the robot controller with the manually-entered
points.

The user interface application can have a maximum angle
that is allowed between entered points. For example, the
maximum angle could be 120 degrees between points
although other maximum angles greater or less than 120
degrees are possible. If the maximum angle allowed between
entered points is 120 degrees, a circular welding path could
be defined by the entry of four points (e.g., one point at 0
degrees, one point at or substantially at 120 degrees and one
point at or substantially at 240 degrees to establish the curved path, and then entry of a final endpoint at or
substantially at 360 degrees). The angle between adjacent
points 410, 412, 414, 416, 418, 420 in FIG. 5 is 60 degrees
to illustrate a 120 degree spacing between manually-entered
arc segment endpoints 414 and 418 and also between
endpoints 418 and 410.

Once a curved or circular path is established, the user
interface application can determine whether or not a subse-
quently-entered arc segment endpoint is on the curved path.
If the subsequently-entered arc segment endpoint is on the
curved path, then the user interface application automati-
cally interpolates the midpoint along the curved path
between two most recently input arc segment endpoints.
However, if the subsequently-entered arc segment endpoint
is not on the curved path, then the user either entered the
point incorrectly or is trying to define a second curved path
different from the established curved path. In either case, the
user interface application can display a message informing
the user that the last entered point is not on the curved path.
For example, the user interface application could generate an
appropriate warning message and/or generate a message
requesting the user to input a further point in order to define
a new curved path from the end of the previously-estab-
lished curve to the subsequently-entered points.

To determine whether or not an entered point is on the
curved path, the user interface application can analyze the
distance of the point from the curved path. For example, the
user interface application can determine or calculate the
distance of the point to the curved path and compare the
distance to a predefined threshold distance or tolerance.
When the distance of the point to the curved path is within
the threshold (e.g., less than the threshold distance), the user
interface application will automatically interpolate the cor-
responding midpoint along the curved path as discussed
above. When the distance of the point to the curved path is
outside of the threshold, the user interface application can
generate a message informing the user that the last entered
point is not on the curved path. Such an "orphaned point"
can either be canceled and reentered correctly by the user, or
the user can enter another point to establish a new curved
path (e.g., enter another point further along the new curved
path). The threshold distance for determining whether nor
not an entered point is on the curved path can be based on
a typical or expected weld bead width, such as 5 mm, 10
mm, 15 mm, etc. In an example embodiment, the threshold
distance is not greater than 15 mm.

Figure 6:
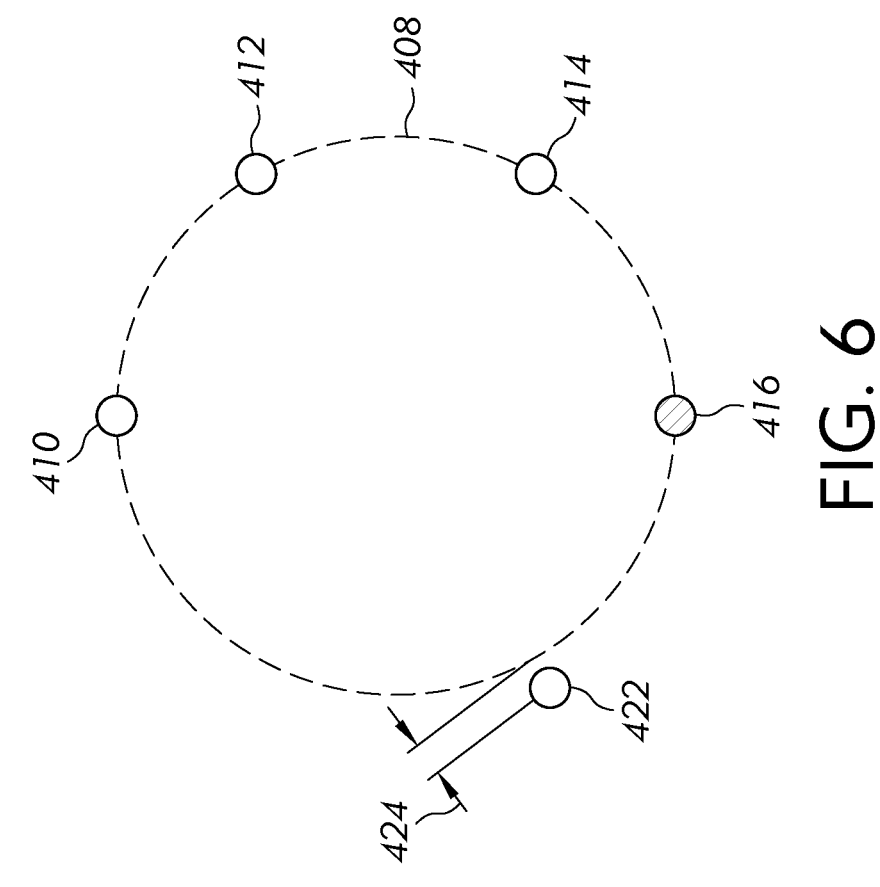
FIG. 6 shows an example circular welding path.

FIG. 6 shows an arc segment endpoint 422 that is off of
the curved path 408 by a distance 424. The distance 424 is
measured perpendicular or normal to the tangent of the
curved path 408 as shown. To calculate the distance 424, the
user interface application can project point 422 onto the
curved path 408 and determine the distance between original
point and projected point. When the distance 424 is within
the predetermined threshold distance or tolerance, the user
interface application will automatically interpolate the mid-
point 416 between arc segment endpoints 414 and 422.

Figure 7:
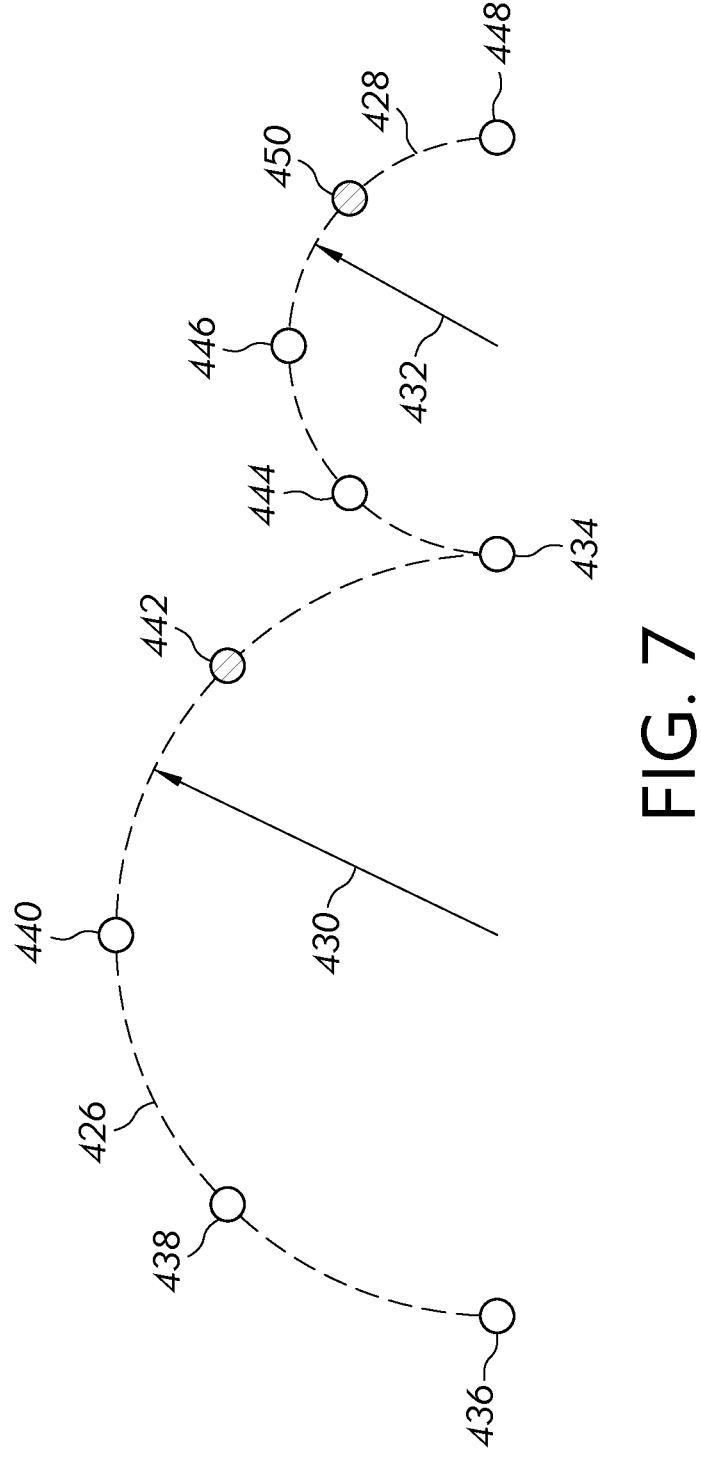
FIG. 7 shows example curved welding paths.

FIG. 7 illustrates two different curved weld paths 426, 428
having different radii 430, 432 and which share a common
arc segment endpoint 434. The first curved path 426 is
defined by points 436, 438 and 440. Common arc segment
endpoint 434 is on the first curved path 426. The midpoint
442 between points 440 and 434 is automatically interpo-
lated by the user interface application. Point 444 was input
subsequent to the common arc segment endpoint 434 and is
not on the first curved path 426 (i.e., it is outside the
predefined tolerance or threshold distance from the curved
path). An additional arc segment endpoint 446 was input to define the second curved path 428 from points 434, 444, and 446. Arc segment endpoint 448 is on the second curved path 428. The midpoint 450 between points 446 and 448 is automatically interpolated by the user interface application.

FIG. 8 shows a flow diagram of an example method of programming a curved path for a welding cobot using the user interface application discussed herein. The method includes recording input of a first arc segment endpoint along the curved path (step 500) and then recording input of an intermediate point along the curved path (step 502) and recording input of a second arc segment endpoint along the curved path (step 504). The intermediate point is located along the curved path between the first arc segment endpoint and the second arc segment endpoint. The user interface application then determines the curved path from the first arc segment endpoint, the intermediate point, and the second arc segment endpoint (step 506). Input of a third arc segment endpoint is recorded (step 508). The user interface application determines a distance of the third arc segment endpoint to the curved path (step 510) and compares the distance to a threshold distance (step 512). The user interface application automatically interpolates a second intermediate point (e.g., midpoint) along the curved path between the second arc segment endpoint and the third arc segment endpoint when the distance of the third arc segment endpoint to the curved path is less than the threshold distance (step 514). The user interface application communicates the first arc segment endpoint, the second arc segment endpoint, the third arc segment endpoint, the first intermediate point, and the second intermediate point to a robot controller to program movements of the welding robot (step 516). The user interface application can also record input of a fourth arc segment endpoint (step 518) and determine a distance of the fourth arc segment endpoint to the curved path (step 520). The user interface application can generate a warning message and/or request input of an additional point when the distance of the fourth arc segment endpoint to the curved path is greater than the threshold distance (step 522).

Figure 9:
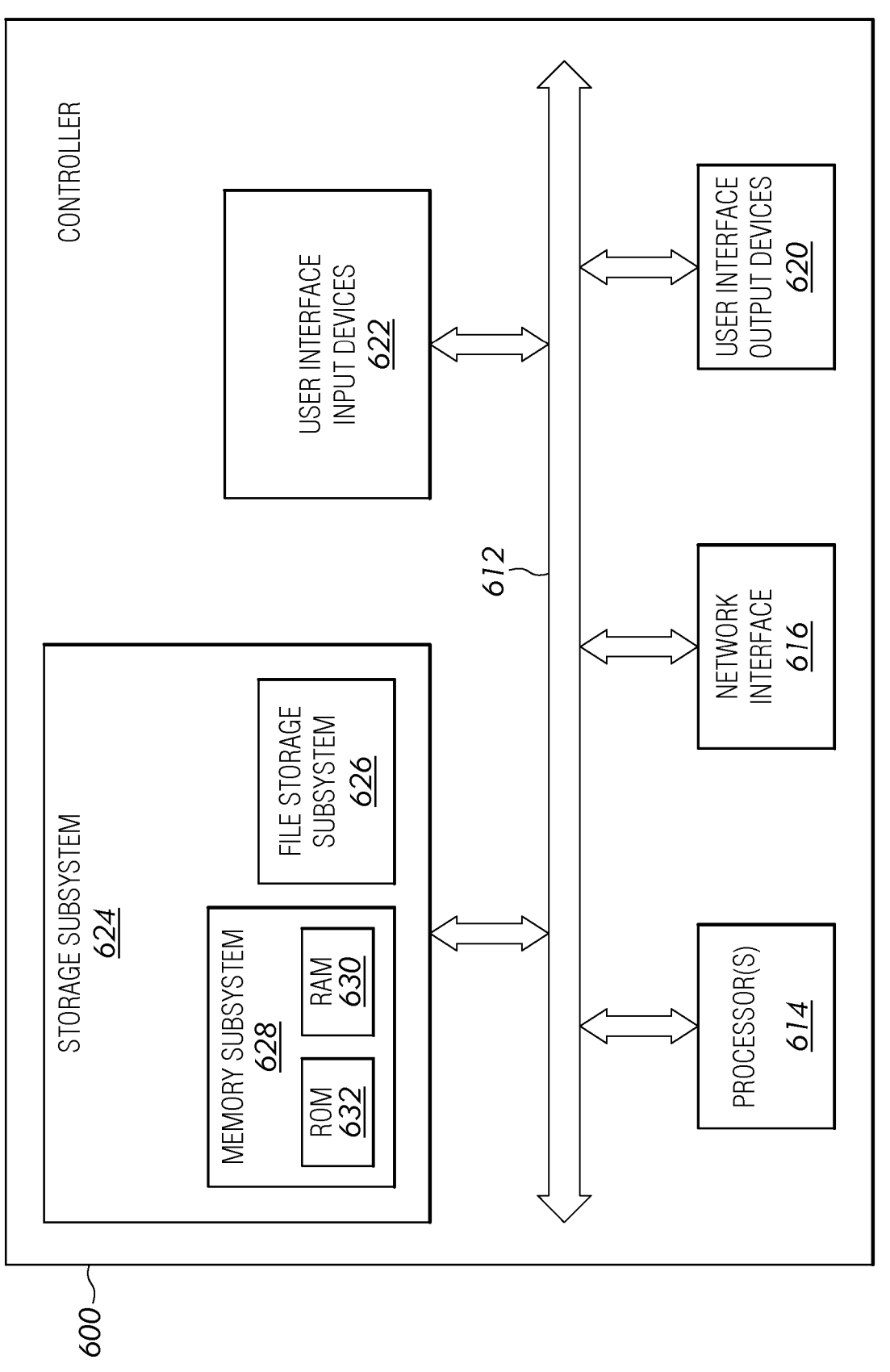
FIG. 9 illustrates a block diagram of an example embodiment of a controller that can be used, for example, in the welding system of FIGS. 1 and 2.

FIG. 9 illustrates a block diagram of an example embodiment of a controller 600 that can be used, for example, in the welding system 100 shown in FIGS. 1 and 2. For example, the controller 600 may be used in the robot controller 320 and/or as a controller in the welding power supply 310. Referring to FIG. 6, the controller 600 includes at least one processor 614 (e.g., a microprocessor, a central processing unit, a graphics processing unit) which communicates with a number of peripheral devices via bus subsystem 612. These peripheral devices may include a storage subsystem 624, including, for example, a memory subsystem 628 and a file storage subsystem 626, user interface input devices 622, user interface output devices 620, and a network interface subsystem 616. The input and output devices allow user interaction with the controller 600. Network interface subsystem 616 provides an interface to outside networks and is coupled to corresponding interface devices in other devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into the controller 600 or onto a communication network.

User interface output devices 620 may include a display subsystem, a printer, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from the controller 600 to the user or to another machine or computer system.

Storage subsystem 624 stores programming and data constructs that provide some or all of the functionality described herein. For example, computer-executable instructions and data are generally executed by processor 614 alone or in combination with other processors. Memory 628 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a solid state drive, a floppy disk drive along with associated removable media, a CD-ROM drive, an optical drive, or removable media cartridges. The computer-executable instructions and data implementing the functionality of certain embodiments may be stored by file storage subsystem 626 in the storage subsystem 624, or in other machines accessible by the processor(s) 614.

Bus subsystem 612 provides a mechanism for letting the various components and subsystems of the controller 600 communicate with each other as intended. Although bus subsystem 612 is shown schematically as a single bus, alternative embodiments of the bus subsystem may use multiple buses.

The controller 600 can be of varying types. Due to the ever-changing nature of computing devices and networks, the description of the controller 600 depicted in FIG. 6 is intended only as a specific example for purposes of illustrating some embodiments. Many other configurations of a controller are possible, having more or fewer components than the controller 600 depicted in FIG. 6.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A method of programming a curved path for a welding robot, comprising the steps of:

recording input of a first arc segment endpoint along the curved path;

recording input of a first intermediate point along the curved path;

recording input of a second arc segment endpoint along the curved path, wherein the first intermediate point is located along the curved path between the first arc segment endpoint and the second arc segment endpoint;

determining the curved path from the first arc segment endpoint, the first intermediate point, and the second arc segment endpoint;

recording input of a third arc segment endpoint;

determining a distance of the third arc segment endpoint to the curved path;

comparing the distance to a threshold distance;

automatically interpolating a second intermediate point along the curved path between the second arc segment endpoint and the third arc segment endpoint when the distance of the third arc segment endpoint to the curved path is less than the threshold distance; and communicating the first arc segment endpoint, the second arc segment endpoint, the third arc segment endpoint, the first intermediate point, and the second intermediate point to a robot controller to program movements of the welding robot.

2. The method of claim 1, wherein the threshold distance is not greater than 15 mm.

3. The method of claim 1, further comprising the steps of:

recording input of a fourth arc segment endpoint;

determining a distance of the fourth arc segment endpoint to the curved path; and generating a warning message when the distance of the fourth arc segment endpoint to the curved path is greater than the threshold distance.

4. The method of claim 1, further comprising the steps of:

recording input of a further point;

determining a distance of the further point to the curved path; and generating a message requesting input of an additional point when the distance of the further point to the curved path is greater than the threshold distance.

5. The method of claim 4, wherein the curved path is a first curved path and the additional point is a fourth arc segment endpoint, and wherein the third arc segment endpoint, the further point, and the fourth arc segment endpoint define a second curved path different from the first curved path.

6. The method of claim 5, wherein the first curved path and the second curved path have different radii.

7. The method of claim 1, further comprising the step of displaying a selector button wherein activation of the selector button initiates input of the curved path.

8. A welding system, comprising:

a collaborative robot having a movable arm;

a robot controller operatively connected to the collaborative robot;

a welding torch attached to the movable arm of the collaborative robot;

a welding power supply operatively connected to the welding torch to supply welding current to the welding torch; and a teach pendant in communication with at least one of the robot controller and the welding power supply, wherein the teach pendant includes a user interface application configured for programming a plurality of welding points of a welding operation performed by the collaborative robot, and wherein the user interface application is configured to:

receive input of a first arc segment endpoint along a curved path, receive input of a first intermediate along the curved path, and receive input a second arc segment endpoint along the curved path, wherein the first intermediate point is located along the curved path between the first arc segment endpoint and the second arc segment endpoint, determine the curved path from the first arc segment endpoint, the first intermediate point, and the second arc segment endpoint, receive input of a third arc segment endpoint and determine a distance of the third arc segment endpoint to the curved path, compare the distance to a threshold distance and automatically interpolate a second intermediate point along the curved path between the second arc segment endpoint and the third arc segment endpoint when the distance of the third arc segment endpoint to the curved path is less than the threshold distance, and communicate the first arc segment endpoint, the second arc segment endpoint, the third arc segment endpoint, the first intermediate point, and the second intermediate to the robot controller to program movements of the collaborative robot.

9. The welding system of claim 8, wherein the threshold distance is not greater than 15 mm.

10. The welding system of claim 8, wherein the second arc segment endpoint and the third arc segment endpoint are substantially 120 degrees apart along the circular path.

11. The welding system of claim 8, wherein the user interface application is further configured to:

receive input of a fourth arc segment endpoint, determine a distance of the fourth arc segment endpoint to the curved path, and generate a warning message when the distance of the fourth arc segment endpoint to the curved path is greater than the threshold distance.

12. The welding system of claim 8, wherein the user interface application is further configured to:

receive input of a further point, determine a distance of the further point to the curved path, and generate a message requesting input of an additional point when the distance of the further point to the curved path is greater than the threshold distance.

13. The welding system of claim 12, wherein the curved path is a first curved path and the additional point is a fourth arc segment endpoint, and wherein the third arc segment endpoint, the further point, and the fourth arc segment endpoint define a second curved path different from the first curved path.

14. The welding system of claim 13, wherein the first curved path and the second curved path have different radii.

15. The welding system of claim 8, wherein the user interface application displays a selector button, and wherein activation of the selector button initiates input of the curved path.

16. A welding system, comprising:

a collaborative robot having a movable arm;

a robot controller operatively connected to the collaborative robot;

a welding torch attached to the movable arm of the collaborative robot;

a welding power supply operatively connected to the welding torch to supply welding current to the welding torch; and a teach pendant in communication with at least one of the robot controller and the welding power supply, wherein the teach pendant includes a user interface application configured for programming a plurality of welding points of a welding operation performed by the collaborative robot, and wherein the user interface application is configured to:

receive input of a first arc segment endpoint along a curved path, receive input of a first intermediate point along the curved path, and receive input a second arc segment endpoint along the curved path, wherein the first intermediate point is located along the curved path between the first arc segment endpoint and the second arc segment endpoint, determine the curved path from the first arc segment endpoint, the first intermediate point, and the second arc segment endpoint, receive input of a third arc segment endpoint along the curved path;

receive input of a fourth arc segment endpoint along the curved path;

automatically interpolate a second intermediate point along the curved path between the second arc segment endpoint and the third arc segment endpoint and automatically interpolate a third intermediate point along the curved path between the third arc segment endpoint and the fourth arc segment endpoint, and communicate the first arc segment endpoint, the second arc segment endpoint, the third arc segment endpoint, the fourth arc segment endpoint, the first intermediate point, the second intermediate point, and the third intermediate to the robot controller to program movements of the collaborative robot.

17. The welding system of claim 16, wherein the user interface application is further configured to determine respective distances of the third arc segment endpoint and the fourth arc segment endpoint to the curved path and compare the respective distances to a threshold distance.

18. The welding system of claim 17, wherein the threshold distance is not greater than 15 mm.

19. The welding system of claim 18, wherein the first arc segment endpoint, the second arc segment endpoint, the third arc segment endpoint, and the fourth arc segment endpoint define a complete circular weld.

20. The welding system of claim 16, wherein the user interface application displays a selector button, and wherein activation of the selector button initiates input of the curved path.

* * * * *